No. 715,400. Patented Dec. 9, 1902.
A. A. LOW.
MEANS FOR PRESERVING MAPLE SUGAR.
(Application filed June 26, 1902.)
(No Model.)
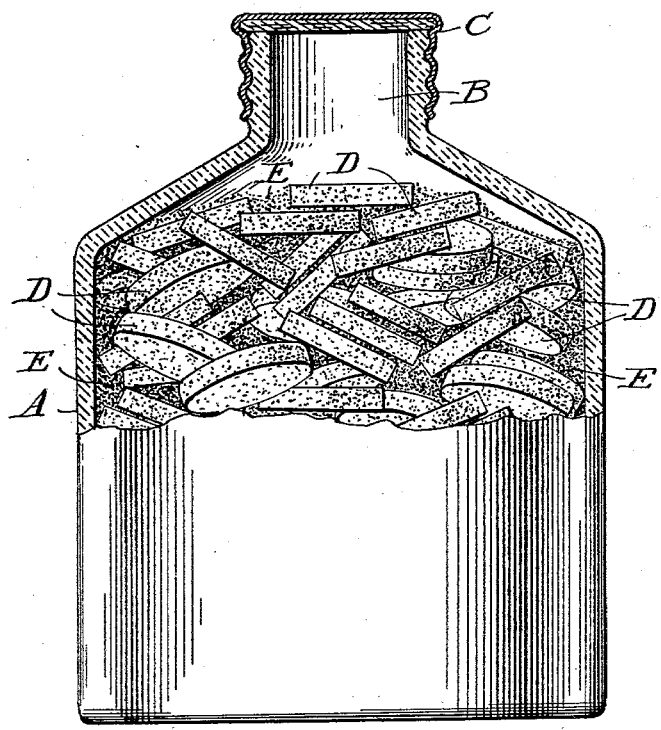
WITNESSES:
INVENTOR
BY
ATTORNEY

UNITED STATES PATENT OFFICE.

ABBOT AUGUSTUS LOW, OF HORSESHOE, NEW YORK.

MEANS FOR PRESERVING MAPLE-SUGAR.

SPECIFICATION forming part of Letters Patent No. 715,400, dated December 9, 1902.

Application filed June 26, 1902. Serial No. 113,225. (No specimens.)

*To all whom it may concern:*

Be it known that I, ABBOT AUGUSTUS LOW, a citizen of the United States, residing at Horseshoe, county of St. Lawrence, State of New York, have invented certain new and useful Improvements in Means for Preserving Maple-Sugar Free from Sweating, of which the following is a specification.

My invention relates to preventing condensation of moisture upon cakes of maple-sugar when packed in closed receptacles for transportation and sale; and it consists in a certain combination of elements fully specified hereinafter and claimed at the end of this specification.

It is well known that maple-sugar formed into cakes for transportation and sale when inclosed in receptacles accumulates moisture upon the surfaces of the cakes, especially in hot weather. This causes the cakes to stick together and deliquesce. To remedy this difficulty, I have made my present invention.

In order that those skilled in the art to which my invention appertains may understand and practice my invention, I will proceed to describe it by reference to the drawing herewith, in which the figure is an elevation of one form of receptacle containing maple-sugar cakes mixed with granulated maple-sugar. A small quantity of the granulated maple-sugar added to the large number of caked sugar is sufficient to absorb the moisture from the solid cake and acts as sponge to take up moisture without becoming thereby injured itself.

Maple-sugar is especially liable to throw out moisture when in cake form, and no material other than the granulated form of the same sugar is available to take up that moisture without imparting to the sugar a foreign flavor or taking away the maple flavor from the cakes and injuring their value.

I have proved the virtue of my invention effectively after long experimenting with it and with other substitutes therefor, which have proved valueless and injurious. Ordinary cane-sugar in cakes, unlike maple-sugar, is crystalline and is not subject to the same difficulty.

Having now fully described my invention and the manner in which I have embodied it, what I claim as new and as my invention, and desire to secure by Letters Patent, is—

As a means for preventing maple-sugar cakes from moisture condensation, the combination consisting of the maple-sugar cakes; and granulated maple-sugar tightly inclosed together in a receptacle, substantially as specified.

In testimony whereof I have signed my name to this specification, in the presence of two subscribing witnesses, this 13th day of June, 1902.

ABBOT AUGUSTUS LOW.

Witnesses:
   JAMES M. HICKS,
   GEO. WELLING GIDDINGS.